(12) United States Patent
Kim

(10) Patent No.: US 8,655,392 B2
(45) Date of Patent: Feb. 18, 2014

(54) GENERIC PAGING SERVICE FOR THIRD-PARTY APPLICATIONS OVER WIRELESS NETWORKS

(75) Inventor: Byoung-Jo Kim, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 413 days.

(21) Appl. No.: 12/609,435

(22) Filed: Oct. 30, 2009

(65) Prior Publication Data

US 2011/0105154 A1    May 5, 2011

(51) Int. Cl.
*H04W 68/00* (2009.01)
*H04M 3/16* (2006.01)

(52) U.S. Cl.
USPC .................................. 455/458; 455/410

(58) Field of Classification Search
USPC ................. 455/458, 414.1, 411, 466
See application file for complete search history.

(56) References Cited

U.S. PATENT DOCUMENTS

| 8,068,431 B2 * | 11/2011 | Varadarajan et al. | 370/241 |
| 2007/0070958 A1 * | 3/2007 | Rinne et al. | 370/338 |
| 2010/0041424 A1 * | 2/2010 | Osborn | 455/466 |
| 2010/0210240 A1 * | 8/2010 | Mahaffey et al. | 455/411 |

OTHER PUBLICATIONS

Mobile IPv6 and Ip paging for dormant mode location update in macrocellular and hotspot networks.*
Mobile IPv6 and IP paging for dormant mode location update in macrocellular and hotspot networks; 2003.*
IP Mobility Support for IPv4, IETF RFC 3344 <http://tools.ietf.org/html/rfc3344>.
Proxy Mobile IPv6, RFC 5213 <http://tools.ietf.org/html/rfc5213>.
Mobile IPv6 support for dual stack Hosts and Routers (DSMIPv6), <http://tools.ietf.org/html/draft-ietf-mip6-nemo-v4traversal-05>.
H. Schulzrinne, E. Wedlund, "Application-layer mobility using SIP," <http://www.cs.columbia.edu/~hgs/papers/Schu0007_Application.pdf>.
V. Prabhakaran, "How to Configure Exchange Server Always Up-To-Date Notifications," <http://technet.microsoft.com/en-us/library/cc164312%28EXCHG.65,printer%29.aspx>.
"Understanding Direct Push," <http://technet.microsoft.com/en-us/library/aa997252%28printer%29.aspx>.
Push Extensions to the IMAP Protocol (P-IMAP), IETF draft-maes-lemonade-p-imap <http://tools.ietf.org/html/draft-maes-lemonade-p-imap-03>.

(Continued)

*Primary Examiner* — Michael Faragalla
(74) *Attorney, Agent, or Firm* — Turocy & Watson, LLP

(57) ABSTRACT

System(s), method(s), and device(s) that provide generic paging service for applications, including third-party applications, over a wireless network are presented. A mobile device generates a token that is used to prove an existing relationship with, and is provided to, an application server, which can relate to a third-party application. The server includes a paging initiator component that presents the token to a paging coordinator component in the network to facilitate proving the server's relationship with, and triggering paging of, the mobile device, without the server having to establish a prior relationship with the network. The paging coordinator component can verify the token to ensure that the initiated paging event is a legitimate paging, and, when verified, transmits the paging to the mobile device. In response, the mobile device can switch out of power-saving dormant mode and establish an IP connection to the server to retrieve a notification(s).

20 Claims, 9 Drawing Sheets

(56) References Cited

OTHER PUBLICATIONS

IMAP4 IDLE command, IETF RFC 2177 <http://tools.ietf.org/html/rfc2177>.

"Apple Push Notification Service," <http://developer.apple.com/IPhone/library/documentation/NetworkingInternet/Conceptual/RemoteNotificationsPG/ApplePushService/ApplePushService.html>.

"3GPP Specification Detail," <http://www.3gpp.org/ftp/Specs/html-info/23237.htm>.

J. Kempf, P. Mutaf, "IP paging considered unnecessary: Mobile IPv6 and IP paging for dormant mode location update in macrocellular and hotspot networks," <http://citeseer.ist.psu.edu/cache/papers/cs/32031/http:zSzzSzwww.inrialpes.frzSzplanetezSzpeoplezSzmutafzSzwcnc03.pdf/ip-paging-considered-unnecessary.pdf>.

* cited by examiner

GENERIC PAGING SERVICE FOR THIRD-PARTY APPLICATIONS OVER WIRELESS NETWORKS

TECHNICAL FIELD

The subject innovation generally relates to wireless communications, and, more particularly, to generic paging service for third-party applications over wireless networks (e.g., cellular wireless networks).

BACKGROUND

Many wireless communication devices (e.g., cellular phones, laptop computers, etc.) have the ability to access the Internet to receive data from or send data to other communication devices (e.g., servers). Communication networks, such as cellular mobile networks are striving to provide always-on Internet Protocol (IP) connectivity to wireless communication devices. For instance, Mobile IP (MIP) and its variants, such as Proxy MIP and Dual Stack MIP, are being employed to provide IP layer continuity across handoffs and reachability to communication devices. MIP also is being utilized to perform routing support for roaming, multi-network internetworking, and vertical handoffs.

Meanwhile, the wired Internet has been employing persistent connections to services and/or client-initiated pull with periodic or more intelligent schedules based on various user and network activities in order to provide reachability at the application layer. In some instances, this can achieve the appearance of constant or near real-time reachability to users. Some examples involve email, instant chat, RSS feeds, and presence services (e.g., email clients polling their servers periodically, instant messaging clients maintaining open sockets to their servers at all times if possible). This is due to the dynamic nature of most end-host IP address assignments, and the extensive use of Network Address and Port Translation (NAPT) that prevents application servers from discovering their clients' IP addresses and initiating connections when needed.

MIP can provide IP address preservation during handoff across multiple IP subnets via tunnels to Home Agents (HAs), thus applications and the transport layer (e.g., transmission control protocol (TCP)) do not see IP address changes. This allows existing IP connections (or sockets) to survive subnet changes, thus allowing Voice over IP (VoIP) or streaming media sessions to work without modification, e.g., session continuity. However, besides the above two applications and other similar applications, most IP applications do not require session continuity but rather reachability at the application layer, e.g., to be notified of events of interest rather than having IP packets delivered at all times (which is one way, but not the only way, to achieve reachability). This is applicable, for example, during idle periods under dormant power—a save state widely used in mobile communication devices to achieve long standby performance. Other connections can deal with IP address changes during handoffs via reconnection (e.g., web browsers) and other application specific countermeasures, such as session initiated protocol (SIP) mobility or IP multimedia subsystem (IMS) service continuity (SC).

Paging also can be handled using wide area two-way paging networks, where the paging services use large cells and low rate high-power radio channels to deliver small amount of texts that were combined into email messages on compatible devices. In certain instances, such a system can use networks such as CDPD and MobiTex that can use permanent logical connections (i.e., an assigned IP address that never changes and can serve as a permanent ID mapped to layer 2 paging). Another conventional paging system involves the use of several datacenters that handle notifications and the delivery of messages in relatively small fragments (e.g., 2 kbytes). These datacenters are connected to specified servers via persistent connections through firewalls. The specified servers interface with email and other desired systems. The actual notification from the infrastructure to the client devices are handled in a manner that requires prior arrangements with wireless data network carriers, by querying HLR and triggering layer 2 paging (if there is no connection open to a client such as when the client has been idle for awhile).

Another form of conventional paging involves special SMS notifications that automatically trigger email clients to initiate IP connections to their servers. The SMS messages contain specially encoded information to indicate specific actions that the client needs to take and the SMS messages are invisible to users as the messages are not exposed to the normal SMS user interfaces. This form of paging has been disfavored, due to the cost of SMS messages and its non-guaranteed delivery and variable delays.

Yet another form of conventional paging involves using a persistent socket connection to achieve a "direct push" service for real-time updates for email, calendar, and contacts. By adjusting the timing of heartbeat-like messages between the client software on mobile devices and their exchange servers, the protocol attempts to maintain a persistent transmission control protocol (TCP) socket connection that has been originally initiated by the client, potentially through firewalls, and network address port translation (NAPT) devices. The bearer management protocols over cellular mobile networks may tear down the transport service for the persistent connection, but may provide an on-demand reactivation if the same IP address is reserved for the mobile device for a certain period of time. Otherwise, the bearer transport service may be released unbeknownst to the mobile device's IP stack (although the radio interface may be aware of this), and the IP address of the mobile device returned to a pool of IP addresses. The loss of heartbeat packets from server detected by timeouts indicates that the persistent connection has been broken and triggers a new connection establishment by the mobile device. The failure and the success of heartbeat message deliveries at expected intervals adjust the timing of next messages from the client and the server until the approximate longest heartbeat interval that still maintains the connection is found. The client also initiates a new connection when its main radio interface in use is changed between cellular and Wi-Fi, or obtains a new IP address in any case. As this is performed without informing the user, it is possible to achieve the appearance of nearly real-time notification from the server. While there is a working connection, the notifications from the server reaches the client promptly. If there is not a working connection, the client attempts a new connection at the next opportunity possible, with increasingly less aggressive retry strategies as the number of failures increases, to gracefully handle when the mobile device moves out of coverage and loses all connectivity.

Thus, conventionally, paging of mobile devices has been performed by maintaining a long-living or persistent connection between the mobile device and a server and/or paging from the infrastructure to a client mobile device has been handled in a manner that requires prior arrangements with wireless data network carriers.

It is desirable to provide paging services to mobile devices for updates, notifications, etc., with regard to applications and services from servers, particularly with regard to third-party applications, without the mobile devices having to maintain long-living or persistent TCP connections with the corresponding servers and without the servers, initiating the paging, having to establish a prior relationship with the operator networks.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject innovation provides systems, methods, and devices that provide generic paging service for applications, including third-party applications, over a wireless network are presented. In an aspect, a mobile device (e.g., cellular phone, wireless laptop computer, etc.) can generate a token that can be used to prove an existing relationship with an application server (e.g., email server, multimedia server, audio server, video server, news server, financial or stock information server, etc.), which can relate to or provide an application or service (e.g., a third-party application or service) to the mobile device, for example. The token can be provided by the mobile device to the application server via a network (e.g., a communication network that provides wireless connection and communication), and the application server can store the token, which can be utilized at a future desired time by the application server to facilitate paging the mobile device, when the application server desires to page the mobile device. The application server can be associated with the Internet and the network also can be associated with the Internet, and thus, the application server, via a paging coordinator component, which is associated with the network and Internet.

In another aspect, the application server can comprise a paging initiator component that can be used by the application server to facilitate paging mobile devices associated with the communication network. When the application server desires to page the mobile device, the paging initiator component can retrieve the token previously received from the mobile device and stored by the paging initiator component, and can present the token to the paging coordinator component in the network to facilitate proving the application server's relationship with, and triggering paging of, the mobile device, without the application server having to establish a prior relationship with the network.

In an aspect, the paging coordinator component can receive the token from the application server and can analyze the information contained in the token to facilitate verifying the token to ensure that the initiated paging event is a legitimate paging. If and when the paging coordinator component verifies the token, the paging coordinator component can page the mobile device, for example, utilizing layer 2 paging services (e.g., where the network is a mobile cellular network that has layer 2 paging services for voice, IP data, and SMS). In response, as desired, the mobile device, if it is in a power-saving dormant mode, can switch out of power-saving dormant mode and establish an IP connection to the application server to retrieve a notification(s) associated with the page.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
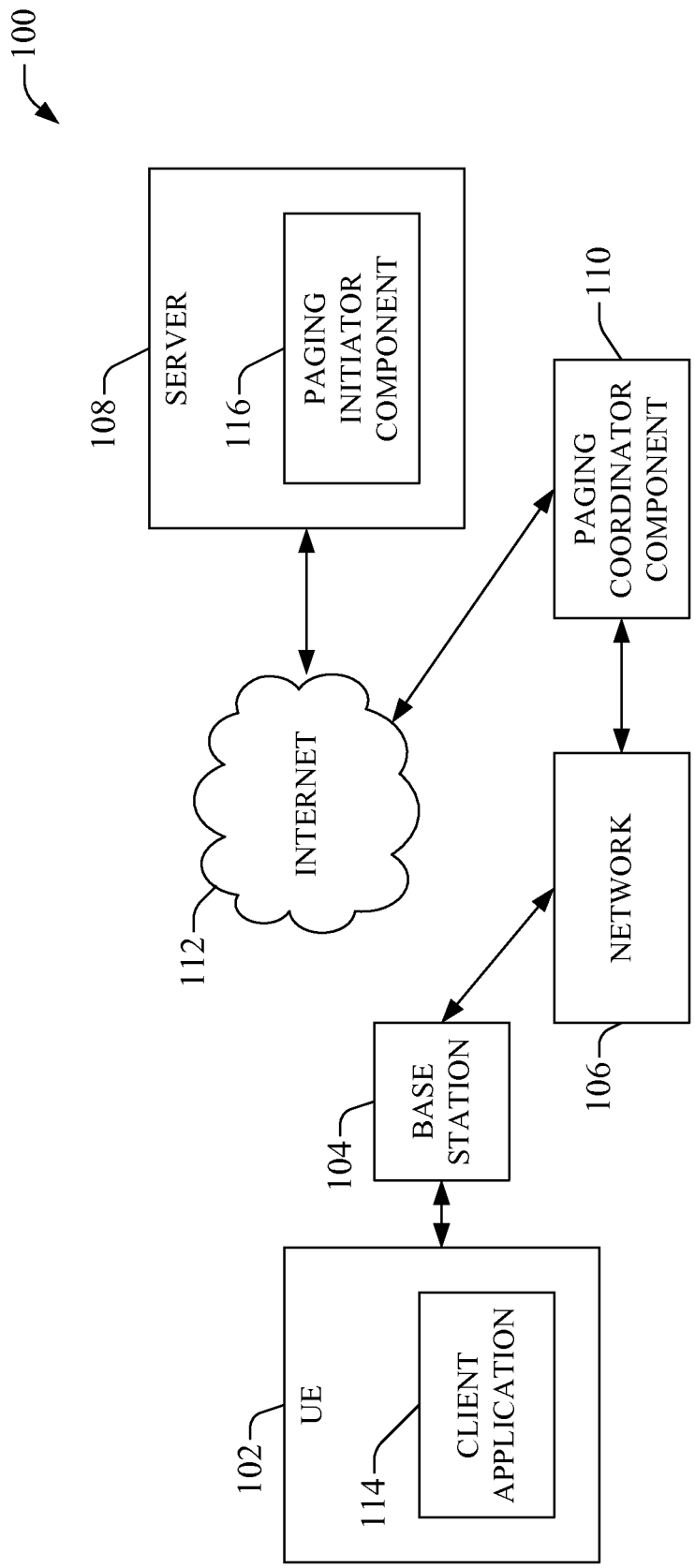
FIG. 1 is a block diagram of an example system that that can enable generic paging of communication devices using layer 2 paging capabilities in a communication network in accordance with an embodiment of the disclosed subject matter.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," "subscriber station," "communication device," "access terminal," "terminal," "handset," and similar terminology, refer to a wireless device (e.g., cellular phone, smart phone, computer, personal digital assistant (PDA), set top box, Internet Protocol Television (IPTV), etc.) utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms.

The following abbreviations are relevant to the subject specification.

3G Third Generation
3GPP Third Generation Partnership Project
AGPS Assisted GPS
AP Access Point
ADSL Asymmetric Digital Subscriber Line
AWS Advanced Wireless Services
BRAS Broadband Remote Access Server
BTA Basic Trading Area
CN Core Network
CS Circuit-Switched
CSCF Call Session Control Function
CPE Customer Premise Equipment
CPN Customer Premise Network
DHCP Dynamic Host Configuration Protocol
DSL Digital Subscriber Line
DSLAM Digital Subscriber Line Access Multiplexer
E911 Enhanced 911
FCC Federal Communications Commission
FL Forward Link
GGSN Gateway GPRS Service Node
GPRS General Packet Radio Service
GPS Global Positioning System
GW Gateway
HAP Home Access Point
HSS Home Subscriber Server
ISDN Integrated Services Digital Network
UE User Equipment
UTRAN Universal Terrestrial Radio Access Network
IMS IP Multimedia Subsystem
IP Internet Protocol
ISP Internet Service Provider
MSA Metropolitan Statistical Areas
MSISDN Mobile Subscriber ISDN Number
MTA Major Trading Areas
NAT Network Address Translation
NTP Network Time Protocol
O&M Operation and Maintenance
PC Personal Computer
PCS Personal Communications Service
PS Packet-Switched
PSTN Public Switched Telephone Network
RAN Radio Access Network
RBS Radio Base Station
RL Reverse Link
RNC Radio Network Controller
RSA Rural Service Area
SGSN Serving GPRS Support Node
SIP Session Initiation Protocol
USSD Unstructured Supplementary Service Data
VPN Virtual Private Network
WAP Wireless Application Protocol
XDSL Asynchronous-DSL or Synchronous-DSL Referring to the drawings, FIG. 1 is a block diagram of an example system 100 that can enable generic paging of communication devices using layer 2 paging capabilities in a communication network in accordance with an embodiment of the disclosed subject matter. In an aspect, example system 100 can include a desired number of user equipment (UE) (e.g., mobile and/or wireless communication device, such as a mobile phone (e.g., 3GPP UMTS phone), personal digital assistant (PDA), computer, IP television (IPTV), gaming console, set-top box, printer, etc.), including UE 102 in a communication environment. The UE 102 can be located in a wireless portion (e.g., region) of the communication network, for example. Each UE 102 can be connected (e.g., wirelessly connected) to respective base stations, such as base station 104, that serve respective coverage areas to facilitate communication in the wireless communication environment. Each base station 104 can serve a respective coverage macro cell that can cover a specified area, and each base station 104 can service mobile wireless devices, such as UE 102, located in the respective area covered by the macro cell, where such coverage can be achieved via a wireless link (e.g., uplink (UL), downlink (DL)). When an attachment attempt is successful, the UE 102 can be served by the base station 104 and incoming voice and data traffic can be paged and routed to the UE 102 through the base station 104, and outgoing voice and data traffic from the UE 102 can be paged and routed through the base station 104 to other communication devices (e.g., another UE). In an aspect, the UE 102 can be connected and can communicate wirelessly using virtually any desired wireless technology, including, for example, cellular, Wi-Fi, Wi-Max, wireless local area networks (WLAN), etc. It is to be appreciated and understood that, while FIG. 1 depicts one UE being served by one base station, the subject innovation is not so limited, as, in accordance with the subject innovation, there can be more than one UE, more than one base station, and/or a base station can serve one or more UEs at a given time.

In an aspect, the base station 104 can be associated with a network 106 that can facilitate wireless communication of voice and data associated with communication devices, such as UE 102, in the communication network. The network 106 can facilitate routing voice and data communications between a communication device(s), such as UE 102, and other communication devices, such as, for example, a server 108 (e.g., application server), which can be an email server, a multimedia server, an audio server, a video server, a news server, a financial or stock information server, etc., and can relate to or provide an application or service (e.g., a third-party application or service) to the UE 102. The network 106 can be and/or can comprise a core network(s) (e.g., PS core network, IMS core network, ...). The network 106 also can allocate resources to the UEs in the network, convert or enforce protocols, establish and enforce Quality of Service (QoS) for the UEs 102, provide applications or services in the network, translate signals, and/or perform other desired functions to facilitate system interoperability and communication in the wireless communication network. The network 106 can include desired components, such as routers, nodes (e.g., SGSN, GGSN, etc.), switches, interfaces, controllers, etc., that can facilitate communication of data between communication devices in the communication network.

The network 106 can be associated with a paging coordinator component 110 that can facilitate enabling generic paging of communication devices, for example, using layer 2 paging capabilities, in accordance with various aspects as disclosed herein. The paging coordinator component 110 and server 108 each can be associated with the Internet 112 to facilitate communication, including paging, between the server 108 and the UE 102 via the network 106.

In a conventional communication network, communication devices can run non-operator provided software applications that provide notifications and updates from corresponding servers such as exchange servers or messaging servers. To achieve what approximates real-time notifications and updates, the devices attempt to maintain long-living or persistent TCP connections to the corresponding servers to achieve the appearance of immediate push notifications, where this is typically achieved with heartbeat-like periodic packets to refresh firewall/network address translation (NAT) and cellular network states with various strategies for their timings. However, as more devices use such an approach, the cellular network will need to maintain bearer states longer and the communication devices will consume more battery power. Further, route optimization, dynamic IP address assignments, local breakout, etc., can be affected by many long-living TCP connections, especially MobileIP based route and session management techniques being adopted by network standards, such as fourth generation (4G) network standards. It is desirable to provide paging services to communication devices for updates, notifications, etc., with regard to applications and services from servers, particularly with regard to third-party applications, without the communication devices having to maintain long-living or persistent TCP connections with the corresponding servers and without the servers, initiating the paging, having to establish a prior relationship with the operator networks.

In contrast to conventional systems and techniques, the subject innovation can utilize existing layer 2 paging capabilities of mobile cellular networks to facilitate paging of communication devices (e.g., UE 102) by a server(s) (e.g., 108), for example, by providing a dynamic mapping between application layer identities and layer 2 identities. In an aspect, the UE 102 can include one or more client applications 114, where a client application 114 can generate and share (e.g., provide, transmit) a token(s) that can cryptographically prove an existing relationship with a corresponding server 108 (e.g., application server). The server 108 can include a paging initiator component 116 and can receive the token, which can be stored by the paging initiator component 116 in a data store, for example. When the server 108 desires to page the UE 102, the paging initiator component 116 can retrieve the token from its data store and can provide (e.g., transmit, communicate, ...) the token to the paging coordinator component 110, and the paging coordinator component 110 can analyze the token (e.g., analyze the information contained in the token) and can verify, or attempt to verify, the token to determine whether the server 108 has an existing and valid relationship with the UE 102. If and when the token is verified by the paging coordinator component 110, the paging coordinator component 110 can communicate the page to the UE 102. The UE 102 can receive the page, where, for example, if the UE 102 is in a dormant mode (e.g., power-saving dormant mode), the UE 102 can determine whether to transfer out of the dormant mode to an active mode or other desired mode (e.g., semi-active mode) and/or whether to initiate a connection to the corresponding server 108. For instance, the UE 102 can initiate a connection to the server 108 by going through network entry process, obtaining an IP address (e.g., if no IP address is currently assigned to the UE 102), and opening a socket.

As disclosed herein, the subject innovation can utilize existing layer 2 paging capabilities (e.g., existing data link layer paging capabilities) of mobile cellular networks to facilitate generic paging services. The paging service for voice call delivery has been in use in wireless cellular networks since the very beginning of cellular voice services, and has been extended to support paging to deliver SMS and IP data under certain circumstances (while IP address to layer 2 mobile identity mapping is active and known). The phone number of a UE 102 can be mapped to an International Mobile Subscriber ID (IMSI) as a permanent ID and its active International Mobile Electronic ID (IMEI): ID of mobile device hardware) can be known to the network (e.g., 106). The location of the UE 102 can be tracked by the network 102 (e.g., using Home Location Register (HLR) and/or Visited Location Register (VLR)) at various desired resolutions based at least in part on activity of the UE 102 and/or other factors with the participation of UEs via location update protocols. At the time of call delivery, the base station 104 that can serve the UE 102 can be located via the respective paging protocols for respective and various cellular radio technologies. The proposed generic paging service of the subject innovation can take advantage of this existing function by exposing it to the applications (e.g., and corresponding servers 108) on the Internet in a controlled manner via the paging coordinator component 110, which can be accessible from the Internet 112. In accordance with various embodiments, the paging coordinator component 110 can be part of, or can have very close relation to, the mobile network operator associated with the network 106.

In an aspect, a client application 114 on the UE 102 can initiate and connect to the server 108 (e.g., email server, messaging server, etc.) associated with the Internet 112. The UE 102 and the server 108 (and thus the paging initiator component 116) can have an existing relationship and share a secret, such as a user name and/or password, a personal identification number (PIN), etc. In accordance with a specified protocol, the client application 114 of the UE 102 can share an ID (e.g., identifier associated with the UE 102) with the paging initiator component 116, the name of the paging coordinator component 110, and a token, such as more fully disclosed herein, that the paging initiator component 116 can use to facilitate proving to the paging coordinator component 110 that the server 108 has an existing relationship with the UE 102. The operating system (OS) of the UE 102 or the client application 114 can register the ID used for the particular server 108 with the paging coordinator component 110. In an aspect, depending on the level of privacy desired, registration of the ID used for the server 108 with the paging coordinator component 110 can be omitted by informing the paging initiator component 116 beforehand of a permanent ID for all servers that the UE 102 uses.

When the paging initiator component 116 of the server 108 desires to contact the UE 102 but does not have an active connection to the UE 102 (and associated client application 114, the paging initiator component 116 can connect to the paging coordinator component 110 and present the token associated with the client application 114 and optionally a short message to be delivered to the UE 102. This message need not be understood by the paging coordinator component 110 and can be encrypted if needed or desired. The paging coordinator component 110 can analyze the token and can verify or attempt to verify the token, such as more fully disclosed herein. If and when the token is verified, the paging coordinator component 110 can utilize the layer 2 paging protocol and layer 2 paging capabilities to locate the UE 102 and wake up the UE 102 from a dormant mode.

If and when the UE 102 connects to the network 106, the token, the short message, and/or other information (e.g., the name of the paging initiator component 116) can be delivered to the mobile client application 114 via layer 2 paging messages, a hidden SMS, or via a retrieval server over IP connection, for example. The client application 114 can receive the token, the short message, and/or other information and can decide whether to initiate a connection to its corresponding server 108 that is initiating the paging, and, as desired, can initiate the connection to that server 108, for example, by going through network entry process, obtain IP address, and opening a socket. In an aspect, the OS on the UE 102 can employ a set of Application Programming Interfaces (APIs) to connect the information delivered via paging from a server(s) 108 to a registered client application(s) 114.

As a result, the subject innovation can allow infrequent notifications to be delivered to UEs 102 from servers 108 without having to maintain a long-living or persistent connection (e.g., TCP connection) between the UEs 102 and servers 108, and without a server 108, when initiating paging of a UE 102, having to establish a prior relationship with the operator network(s). Further, the subject innovation can employ the generic paging service for UEs 102 while enabling a UE 102 to be in power-saving dormant mode as long as possible and as often as possible, and can be employed without an IP address assigned to the UE 102 and with no resources of the network 106 necessarily being dedicated or allocated for the UE 102.

In an aspect, the token utilized by the subject innovation can ensure that only notifications stemming from existing relationships between a UE 102 and a server 108 can trigger paging of the UE 102, while not revealing the purpose or, if desired or needed, the identity of the paging initiator component 116, which initiated the notification, to the network 106 or other parties, for example, by use of aggregation, or relay services for tokens.

The tokens employed by the subject innovation can facilitate proving an existing relationship between the UE 102 and the server 108 (e.g., paging initiator). In an aspect, a token can be created or constructed by the UE 102 (e.g., the client application 114 of the UE 102) such that the token can contain information that can establish proof of prior relationship between the UE 102 (and/or associated client application 114) and the server 108 (and/or associated paging initiator component 116), while revealing no further information, as desired. For example, the client application 114 can hash the respective identifiers of the UE 102 and the server 108 (and/or associated paging initiator component 116) (e.g., which can be arbitrarily created and known between the UE 102 and server 108) and a shared secret between the UE 102 and the server 108. The UE 102 and the server 108 can generate their shared secret from the subscription trust relationship for the cellular service itself (e.g., shared secret can be based at least in part on the username and/or password associated with the client application 114 and the server 108), or by another desired arrangement, such as public key infrastructure (PKI). The client application 114 can generate a hash such that the hash, and the information (e.g., the respective identifiers of the UE 102 and the server 108) that is hashed, can be correctly verified by the paging coordinator component 110, which can have knowledge regarding the hash function or other technique used to hide or obscure the information contained in the token from discovery by other entities (e.g., server 108). When the server 108 desires to page the UE 102, in accordance with a specified paging protocol, the paging initiator component 116 can retrieve the previously received token associated with the UE 102 from the data store associated with the paging initiator component 116 and can present the token, comprising the hash along with the identifier information respectively associated with the UE 102 and the server 108, which can thereby facilitate proving an existing relationship between the UE 102 and the server 108. By using a well-known cryptographic hash function, it is extremely unlikely that a malicious paging initiator can guess many tokens correctly to cause sufficient overload to the paging coordinator component 110 or the wireless network. Also, it is straightforward to use PKI to sign the identities or other information to create a token of similar nature.

In still another aspect, it is not necessary for the token to be encrypted on its own, although the token can be encrypted, if desired. If the token were to be encrypted, such encryption may require existing trust relationships between the paging initiator component 116 and the paging coordinator component 110, which can be undesirable, as it can be desirable to allow for paging of the UE 102 by the server 108 without requiring an existing trust relationship between the server 108 (and associated paging initiator component 116) and the paging coordinator component 110. Since the token can be transmitted without the token being encrypted, if the token is exposed during the transmission between the paging initiator component 116 and the UE 102 or the paging coordinator component 110, the token potentially can be abused to trigger unnecessary paging. Thus, in another aspect, it is desirable (e.g., and in the interest of the UE 102 and the network 106) that the token is transmitted via a secure channel, such as a secure sockets layer (SSL) or other secure path (e.g., an ephemeral security or browser session-like SSL, or mutually authenticated channel can all serve the purpose). Since a paging initiator component may not have a strong incentive to protect a token, as desired, the paging coordinator component 110 and/or the UE 102 can insist on using a secure channel and/or can assign a desired lifetime to the token or rate-limit use of the token. The lifetime of the token can be added to the hash to protect its validity.

In accordance with another aspect or embodiment, the UE 102 can generate and use a one-time token that, as the name suggests, can be utilized one time by the server 108 (and associated paging initiator component 116) to page the UE

102. When one-time tokens are employed, the UE 102 can issue another new token to the server 108 after a successful paging event. However, while the one-time token suggests that such token is only used one time, since it is possible that the paging coordinator component 110 may not be able to verify whether a paging triggered by a particular token has successfully led to a connection establishment between the UE 102 and the page-initiating server 108 and the subsequent issuance of a new token, as desired, the paging coordinator component 110 can allow the same token to be used more than one time (e.g., a specified or low number of times.) In accordance with various other aspects or embodiments, the other desired techniques for abuse detection and/or blacklisting can be employed with the security measures employed with the tokens, as disclosed herein, to facilitate securing the tokens and minimizing undesired or malicious paging of the UEs 102.

It is desirable to maintain the privacy of the identity of the UE 102, for example, by not allowing or enabling the servers 108 to learn the identity of the UE 102. It also is desirable to reveal the identity of the UE 102 used for each server 108 (and respectively associated paging initiator component 116) to the paging coordinator component 110 associated with the network 106 (and operated by the cellular service provider), since the identity of the UE 102 is to be mapped to the permanent layer 2 identity associated with the UE 102 used for layer 2 paging operations. If desired or needed, the UE 102 can use a different randomly generated ID per server 108 (e.g., paging initiator), so the permanent layer 2 identity of the UE 102 can be hidden from the servers 108 themselves or groups of servers 108 to facilitate preventing the servers 108 from collaborating to correlate or discover the identity of the UE 102. In yet another embodiment, the UE 102 can pre-generate and share a number of pseudo identities between the UE 102 and the paging coordinator component 110 beforehand, where the server(s) 108 is not aware of the pseudo identities. As a result, the paging coordinator component 110 can have knowledge of the identity of the UE 102, while the server 108 does not have knowledge of the identity of the UE 102.

In still another aspect, it is desirable that a client application(s) 114 or the OS of the UE 102 discover the DNS name of the paging coordinator component 110 and generate a shared secret(s). There are many factors to consider when deciding configuration options to facilitate discovery of the DNS name of the paging coordinator component 110 and generation of a shared secret(s), where the factors can include, for example, subscriber relationships, roaming, load balancing, future changes, etc. It can be desirable to require UEs 102 to use a home paging coordinator component 110, or respective UEs 102 can be allowed to use a local paging coordinator component 110, as desired, as some configuration schemes potentially are not amenable to conveying dynamic local information (e.g., USIM, factory installation, etc.). Depending at least in part on these factors, one or more of the following can be used to facilitate discovery of the DNS name of the paging coordinator component 110 and generation of a shared secret(s): the name of the paging coordinator component 110 can be installed on the UE 102 before retail, or contained in a SIM card to be employed by the UE 102. Relating or installing the name of the paging coordinator component 110 to/on the UE 102 also can be performed via DHCP options fields, uPnP, Apple Bonjour or other local service location protocols (although these are local configuration protocols, information from home networks can be inserted, for example, via AAA operations and/or unicast delivery under certain arrangements between the local network and home networks (e.g., home addresses or prefixes can be assigned via DHCP proxy/relay and/or router advertisements)); OMA DM, TR-69, or other in-band dynamic device configuration options can be employed; and/or a well-known DNS name or multicast/anycast address can be dedicated to obtaining necessary or desired information associated with the paging coordinator component 110; etc.

The subject innovation can provide advantages over conventional systems and methods for paging. The subject innovation can enable resources in the network 106 to be utilized more judiciously, as for the network 106, there can be less demand to support long lasting connections between the UE 102 and the server 108, thereby lessening the demand on the bearer resources and IP address management, routing, roaming, etc. Also, employing the subject innovation can result in the network 106 using less instances of MIP, whatever form they may be, as compared to conventional systems and techniques for paging. The subject innovation also may result in the extensive use of MIP not being necessary, when combined with larger layer 2 networks, and the opportunistic use of MIP and application layer handoff such as SIP mobility or IMS SC. Employing the subject innovation also can result in a longer battery life for UE 102 as compared to conventional systems and techniques. The subject innovation can result in a lesser need for open sockets by application servers 108 as compared to conventional systems and techniques. Further, the subject innovation can result in the client applications 114 receiving more prompt notifications when an active connection between the UE 102 and the server 108 is not available, as compared to conventional paging systems and methods.

It is to be appreciated and understood that the subject innovation is depicted in FIG. 1 as having one UE 102; one base station 104; one server 108, one paging coordinator component 110; one client application 114; and one paging initiator component 116; however, the subject innovation is not so limited, as there also can be more than one UE; more than one base station; more than one server; more than one paging coordinator component; more than one client application; and/or more than one paging initiator component—as desired. It is to be further appreciated and understood that, while the paging coordinator component 110 is depicted as being a stand-alone unit, the subject innovation is not so limited, as, in accordance with various embodiments, the paging coordinator component 110 can be a stand-alone unit, or can be part of another component in system 100, or portions (e.g., components) of the paging coordinator component 110 can be distributed as separate components throughout the system 100, as desired.

In accordance with one embodiment of the subject innovation, one or more components (e.g., the paging coordinator component 110; paging initiator component 116, etc.) in the communication network can utilize artificial intelligence (AI) methods to infer (e.g., reason and draw a conclusion based at least in part on a set of metrics, arguments, or known outcomes in controlled scenarios) whether a token is verified; whether an instance of paging of a UE 102 by a server 108 is legitimate or malicious (and thus invalid); whether a UE 102 is to awaken from dormant mode and establish a connection with a server 108 upon receiving paging initiated by the server 108; etc. Artificial intelligence techniques typically can apply advanced mathematical algorithms—e.g., decision trees, neural networks, regression analysis, principal component analysis (PCA) for feature and pattern extraction, cluster analysis, genetic algorithm, and reinforced learning—to historic and/or current data associated with system 100 (or another system(s) disclosed herein) to facilitate rendering an inference(s) related to the system 100 (or another system(s) disclosed herein).

In particular, the one or more components in the network can employ one of numerous methodologies for learning from data and then drawing inferences from the models so constructed, e.g., Hidden Markov Models (HMMs) and related prototypical dependency models. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited in accordance with implementing various automated aspects described herein. The foregoing methods can be applied to analysis of the historic and/or current data associated with system 100 (or another system(s) disclosed herein) to facilitate making inferences or determinations related to system 100 (or another system(s) disclosed herein).

Figure 2:
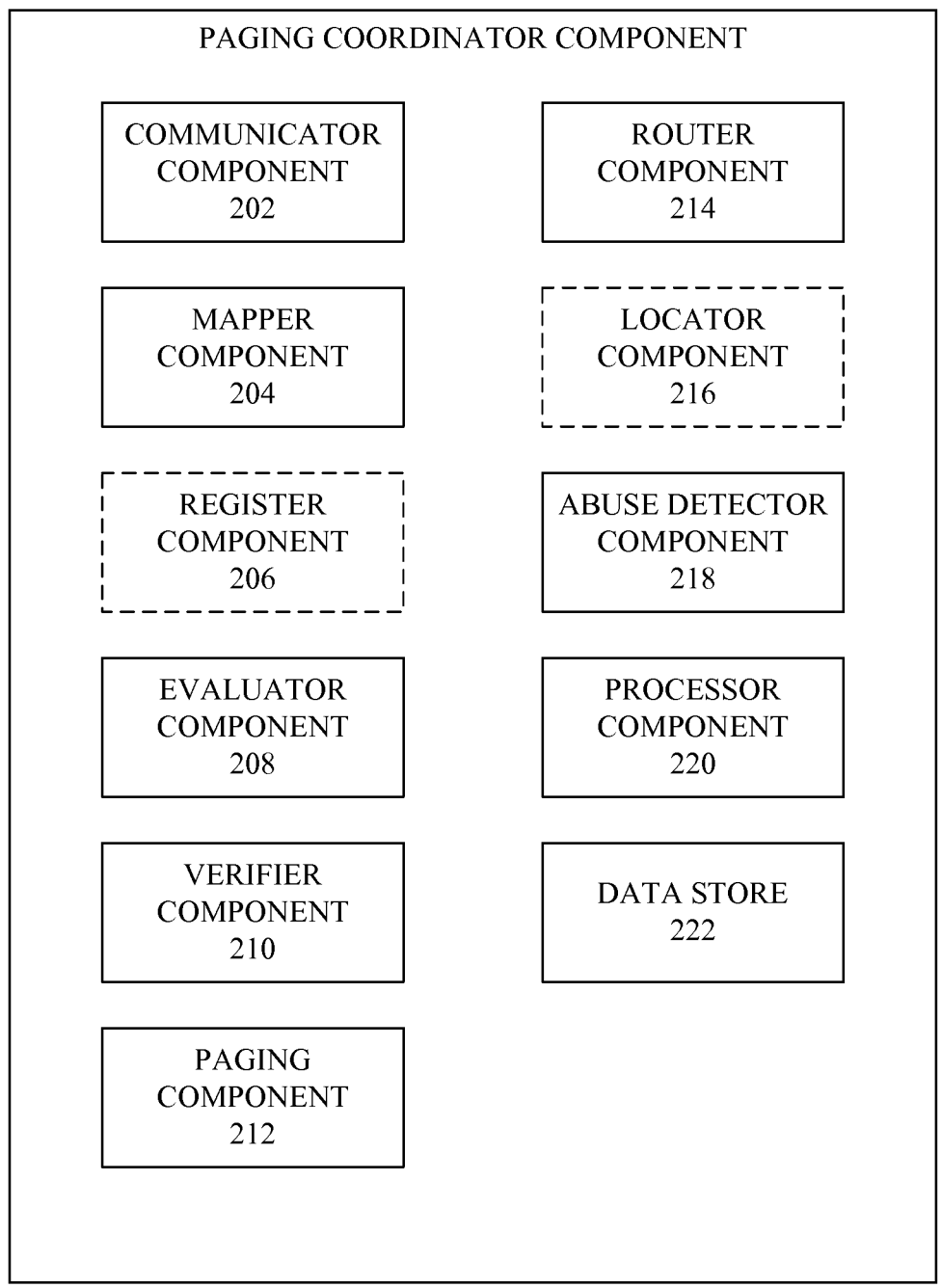
FIG. 2 is a block diagram of an example paging coordinator component in accordance with an aspect of the disclosed subject matter.

FIG. 2 depicts a block diagram of an example paging coordinator component 200 in accordance with an aspect of the disclosed subject matter. In an aspect, the paging coordinator component 200 can be utilized to facilitate paging UEs (e.g., 102) by servers (e.g., 108), paging initiators (e.g., associated with third-party applications), using layer 2 paging capabilities and resources in a communication network. In an aspect, the paging coordinator component 200 can include a communicator component 202 that can communicate (e.g., receive, transmit) information associated with paging of UEs 102 associated with the network 106. For instance, the communicator component 202 can receive tokens and/or other information from UEs 102 when the respective UEs 102 establish a relationship with respective servers 108, or at other desired times, and can receive the tokens and/or other information (e.g., message) from the respective servers 108 when the servers 108 desire to page the respective UEs 102. The communicator component 202 also can transmit paging to a desired UE 102 when the paging of the UE 102 determined to be legitimate or valid by the paging coordinator component 200.

In another aspect, the paging coordinator component 200 also can include a mapper component 204 that can provide a dynamic mapping between application layer identities and layer 2 identities associated with respective UEs 102. While layer 2 paging is being employed in the subject innovation, the UEs 102 do not have to reveal their respective permanent identities to the servers 108, since the mapping is performed by the mapping component 204, and the paging coordinator component 200 is trusted by the UEs 102 via wireless service subscriptions.

In still another aspect, the paging coordinator component 200 optionally can comprise a register component 206 that can enable a UE 102 to register the ID used for a particular server 108, which is used by or associated with the UE 102, with the paging coordinator component 200. In an aspect, the paging coordinator component 200 can include an evaluator component 208 that can analyze and evaluate information, such as a token, received from a server 108 initiating paging of a UE 102 to facilitate verifying whether the token and associated paging of the UE 102 is valid or legitimate. The evaluator component 208 can retrieve a shared secret or hash information (e.g., hash function and/or value) and can utilize the shared secret or hash information to discover information (e.g., identifier associated with the UE 102, identifier associated with the server 108 initiating the paging, etc.) to facilitate determining whether the paging request is legitimate. The paging coordinator component 200 also can comprise a verifier component 210 that can operate in conjunction with the evaluator component 208 to verify whether the token and associated paging of the UE 102 is valid or legitimate based at least in part on predefined paging criteria.

For example, if the information contained in or associated with the token is determined by the verifier component 210 to prove that there is a trusted or existing relationship between the UE 102 and the server 108 initiating the paging of the UE 102 (e.g., the identifier associated with the UE 102, as contained in the token, matches the identifier associated with the UE 102, as contained in the paging request), the verifier component 210 can determine that the paging request is valid or legitimate; if, after the evaluator component 208 evaluates the information contained in or associated with the token, and based at least in part on that evaluation, the verifier component 210 determines that a trusted or existing relationship between the UE 102 and the server 108 initiating the paging of the UE 102 is not proven (e.g., the identifier associated with the UE 102, as contained in the token, does not match the identifier associated with the UE 102, as contained in the paging request), the verifier component 210 can determine that the paging request is not valid or legitimate.

In yet another aspect, the paging coordinator component 200 can contain a paging component 212 that can transmit paging to a desired UE 102 in response to paging of the desired UE 102 initiated by a server 108, when the verifier component 210 verifies that the token and associated paging of the UE 102 by the server 108 is valid or legitimate. The communicator component 202 can facilitate transmitting the paging to the desired UE 102. In an aspect, the paging coordinator component 200 also can include a router component 214 that can facilitate automatically or dynamically routing tokens, messages, paging, notifications, updates, etc., to desired components or devices, such as UEs 102 or servers 108.

The paging coordinator component 200 optionally can comprise a locator component 216 that can locate a base station 104 serving a UE 102 for which paging is desired and/or locate the desired UE 102 in the communication network. Alternatively or additionally, the network 106 can locate the serving base station 104 and/or the desired UE 102 in the communication network. In still another aspect, the paging coordinator component 200 can include an abuse detector component 218 that can detect, identify, and/or flag a server(s) 108 that is improperly or maliciously attempting to page a UE(s) 102. For example, the abuse detector component 218 can detect whether a server 108 initiating a page is an improper or a malicious paging initiator based at least in part on the token and/or information associated therewith presented by the server 108. The abuse detector component 218 can flag, and/or place on a blacklist of untrusted or undesirable paging initiators, a server 108 that is determined to be an improper or a malicious paging initiator, so that paging from such a server 108 can be rejected or at least further scrutinized by the paging coordinator component 200 before making a decision as to whether to communicate the page to a UE 102.

In yet another aspect, the paging coordinator component 200 can comprise a processor component 220 that can work in conjunction with the other components (e.g., communicator component 202, mapper component 204, (optional) register component 206, evaluator component 208, verifier component 210, paging component 212, router component 214, (optional) locator component 216, abuse detector component 218, etc.) to facilitate performing the various functions of the paging coordinator component 200. The processor component 220 can employ one or more processors, microprocessors, or controllers that can process data, such as information relating to tokens, paging requests, mapping of identifiers associated with UEs 102 (e.g., layer 2 mobile identity mapping), location of a UE 102 and/or serving base station 104, evaluation or verification of tokens or associated information in relation to a paging request, detection of abusive paging initiators, etc., to facilitate paging desired UEs 102 in response to legitimate paging requests of servers 108; and can control data flow between the paging coordinator component 200 and other components (e.g., communicator component 202, mapper component 204, (optional) register component 206, evaluator component 208, verifier component 210, paging component 212, router component 214, (optional) locator component 216, abuse detector component 218, UE 102, paging initiator component 116, etc.) associated with the paging coordinator component 200.

The paging coordinator component 200 also can include a data store 222 that can store data structures (e.g., user data, metadata); code structure(s) (e.g., modules, objects, classes, procedures) or instructions; information relating to tokens, paging requests, mapping of identifiers associated with UEs 102, location of a UE 102 and/or serving base station 104, evaluation or verification of tokens or associated information in relation to a paging request, detection of abusive paging initiators, etc.; routing information; predefined paging criteria; network or device information like policies and specifications, paging protocols; code sequences for scrambling; cell IDs; and so on. In an aspect, the processor component 220 can be functionally coupled (e.g., through a memory bus) to the data store 222 in order to store and retrieve information desired to operate and/or confer functionality, at least in part, to the communicator component 202, mapper component 204, (optional) register component 206, evaluator component 208, verifier component 210, paging component 212, router component 214, (optional) locator component 216, abuse detector component 218, and/or substantially any other operational aspects of the paging coordinator component 200.

Figure 3:
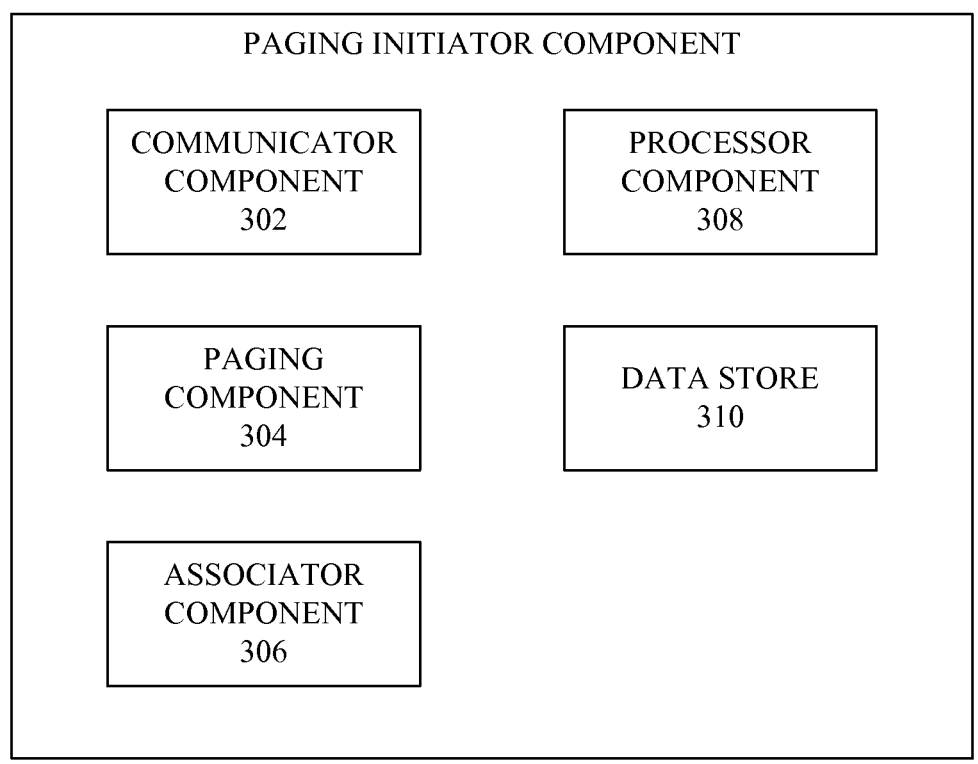
FIG. 3 illustrates a block diagram of an example paging initiator component in accordance with an aspect of the disclosed subject matter.

FIG. 3 illustrates a block diagram of an example paging initiator component 300 in accordance with an aspect of the disclosed subject matter. In an aspect, the paging initiator component 300 can include a communicator component 302 that can communicate (e.g., receive, transmit) information associated with paging of UEs 102 associated with the network 106. For instance, the communicator component 302 can receive information (e.g., shared secret), such as username or password information, from a UE 102 to facilitate establishing a relationship between the UE 102 and the server 108 associated with the paging initiator component 300. The communicator component 302 also can receive tokens and/or other information from a UE 102 when the UE 102 establishes a relationship with the server 108, or at other desired times. The communicator component 202 also can transmit a paging request (e.g., notification, update, etc.), a token, and/or associated information (e.g., message) to the paging coordinator component (e.g., 110, 200) to facilitate paging a desired UE 102, for example, when desired by the paging initiator component 300.

In another aspect, the paging initiator component 300 can include a paging component 304 that can be employed to generate a paging request to page a desired UE 102. The paging request can be presented or transmitted to the paging coordinator component along with other information (e.g., token, message) to facilitate paging the desired UE 102. In still another aspect, the paging initiator component 300 can include an associator component 306 that can associate or map information (e.g., username, password, etc.) associated with a UE 102 with the token received from or associated with that UE 102 to facilitate retrieval of the token when paging of that UE 102 is desired by the paging initiator component 300 or for other desired purposes.

In yet another aspect, the paging initiator component 300 can comprise a processor component 308 that can work in conjunction with the other components (e.g., communicator component 302, paging component 304, associator component 306, etc.) to facilitate performing the various functions of the paging initiator component 300. The processor component 308 can employ one or more processors, microprocessors, or controllers that can process data, such as information relating to tokens, paging requests, associating information relating to respective UEs 102, etc., to facilitate paging desired UEs 102 or for other desired purposes; and can control data flow between the paging initiator component 300 and other components (e.g., communicator component 302, paging component 304, associator component 306, UE 102, paging coordinator component 110, etc.) associated with the paging initiator component 300.

The paging initiator component 300 also can include a data store 310 that can store data structures (e.g., user data, metadata); code structure(s) (e.g., modules, objects, classes, procedures) or instructions; information relating to tokens, paging requests, associating information relating to respective UEs 102, etc., to facilitate paging desired UEs 102 or for other desired purposes; routing information; network or device information like policies and specifications, paging protocols; code sequences for scrambling; and so on. In an aspect, the processor component 308 can be functionally coupled (e.g., through a memory bus) to the data store 310 in order to store and retrieve information desired to operate and/or confer functionality, at least in part, to the communicator component 302, paging component 304, associator component 306, and/or substantially any other operational aspects of the paging initiator component 300.

Figure 4:
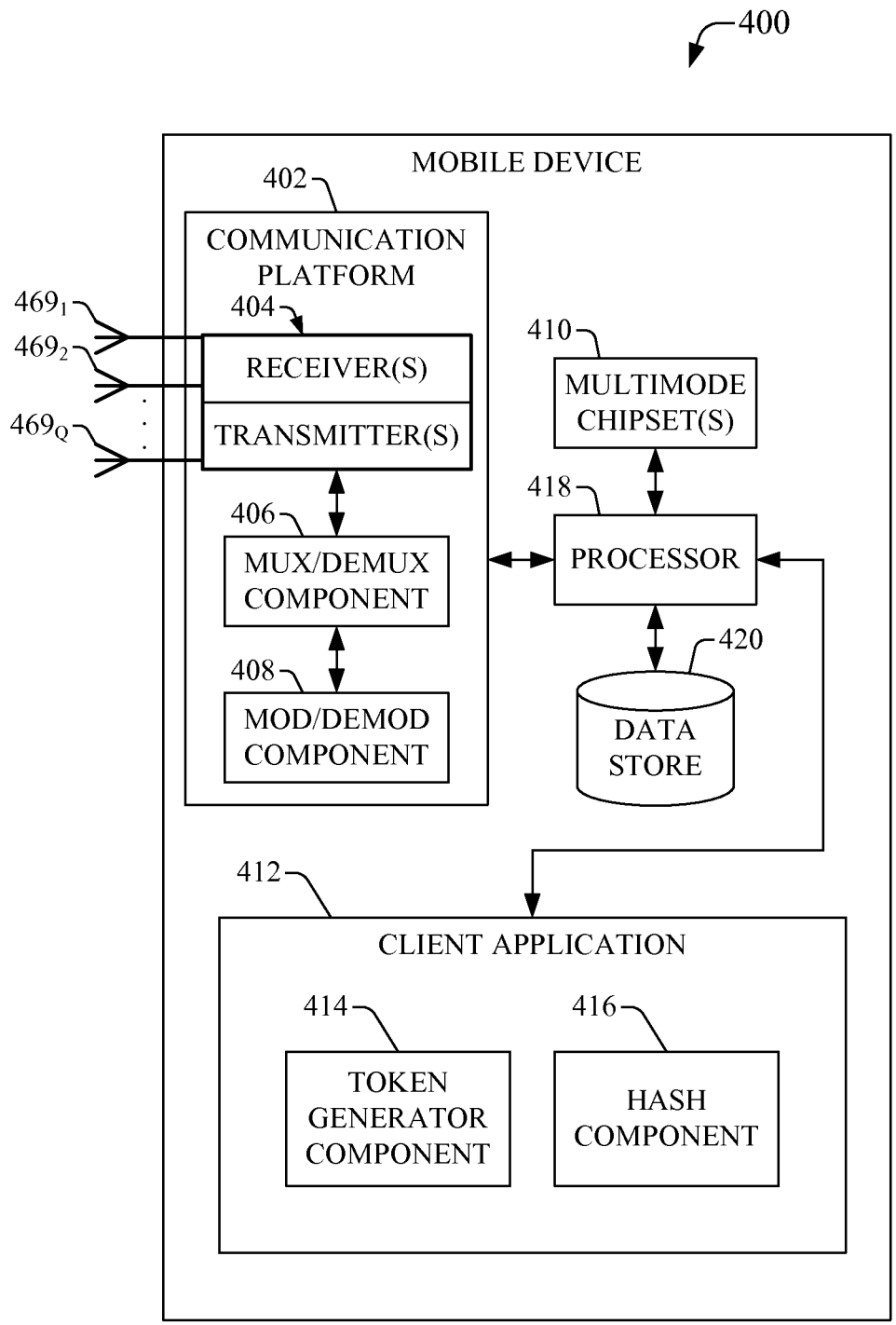
FIG. 4 depicts a block diagram of an example mobile device in accordance with an aspect of the disclosed subject matter.

FIG. 4 depicts a block diagram of an example mobile device 400 (e.g., UE) in accordance with an aspect of the disclosed subject matter. In an aspect, the mobile device 400 can be a multimode access terminal, wherein a set of antennas $469_1$-$469_Q$ (Q is a positive integer) can receive and transmit signal(s) from and to wireless devices like access points, access terminals, wireless ports and routers, and so forth, that operate in a radio access network. It should be appreciated that antennas $469_1$-$469_Q$ are a part of communication platform 402, which comprises electronic components and associated circuitry that provide for processing and manipulation of received signal(s) and signal(s) to be transmitted; e.g., receivers and transmitters 404, multiplexer/demultiplexer (mux/demux) component 406, and modulation/demodulation (mod/demod) component 408.

In another aspect, multimode operation chipset(s) 410 can allow the mobile device 400 to operate in multiple communication modes in accordance with disparate technical specification for wireless technologies. In an aspect, multimode operation chipset(s) 410 can utilize communication platform 402 in accordance with a specific mode of operation (e.g., voice, GPS). In another aspect, multimode operation chipset(s) 410 can be scheduled to operate concurrently (e.g., when Q>1) in various modes or within a multitask paradigm.

In still another aspect, the mobile device 400 can comprise a client application(s) 412 that can be employed to use desired applications, services, or functions (e.g., email, messaging, map generation, news, desired information (e.g., financial or stock market information), etc.) with the mobile device 400. The applications, services, or functions can be associated with respective servers 108 that can facilitate providing such applications, services, or functions, with or using the mobile device 400. In yet another aspect, the client application(s) 412 can include a token generator component 414 that can generate a token that can be provided or transmitted to a server 108, where the token can comprise information that can facilitate proving an existing relationship between the mobile device 400 and the server 108, for example, when the server 108 initiates paging of the mobile device 400 and presents the token to a paging coordinator component (e.g., 110). For instance, the token can comprise information, such as an identifier associated with the mobile device 400, an identifier associated with the server 108 (e.g., paging initiator), a function or value, such as a hash function or value, (e.g., based at least in part on a shared secret between the mobile device 400 and the server 108), which can facilitate hiding or obscuring certain token information, such as the identifier of the mobile device 400, from the server 108.

In an aspect, the client application 412 can include a hash component 416 that can operate in conjunction with the token generator component 414 to secure information associated with or contained in a generated token. The hash component 416 can employ a desired hash function or hash values to facilitate modifying information (e.g., identifier associated with the mobile device 400) associated with the token so that the information can be hidden or obscured from discovery by components, such as a server 108, as desired. For example, as desired, the hash component 416 can generate or create a hash based at least in part on the username and/or password, and/or a randomly generated number, etc. The mobile device 400, which can have a trusted relationship with the paging coordinator component 110, can share the hash function or value for the token with the paging coordinator component 110, so that, at a future time, when the server 108 initiates paging of the UE 102 and presents the token to the paging coordinator component 110, the paging coordinator component 110 can utilize or apply the hash function or value when analyzing the token to discover the information (e.g., identifier associated with the mobile device 400, identifier associated with the server 108, etc.) contained in the token and determine whether paging of the mobile device 400 is legitimate or not.

In still another aspect, the mobile device 400 also can include a processor(s) 418 that can be configured to confer functionality, at least in part, to substantially any electronic component within the mobile device 400, in accordance with aspects of the subject innovation. For example, the processor(s) 418 can facilitate enabling the mobile device 400 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. As another example, the processor(s) 418 can facilitate enabling the mobile device 400 to process data for utilizing a client application(s) 412, generating a token(s), generating a hash function or value, etc.

The mobile device 400 also can contain a data store 420 that can store data structures (e.g., user data, metadata); code structure(s) (e.g., modules, objects, classes, procedures) or instructions; information relating to client applications, tokens, and/or hash functions or values; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; and so on. In an aspect, the processor(s) 418 can be functionally coupled (e.g., through a memory bus) to the data store 420 in order to store and retrieve information (e.g., frequency offsets, desired algorithms, etc.) desired to operate and/or confer functionality, at least in part, to communication platform 402, multi-mode operation chipset(s) 410, client application(s) 412, token generator component 414, hash component 416, and/or substantially any other operational aspects of the mobile device 400.

Figure 5:
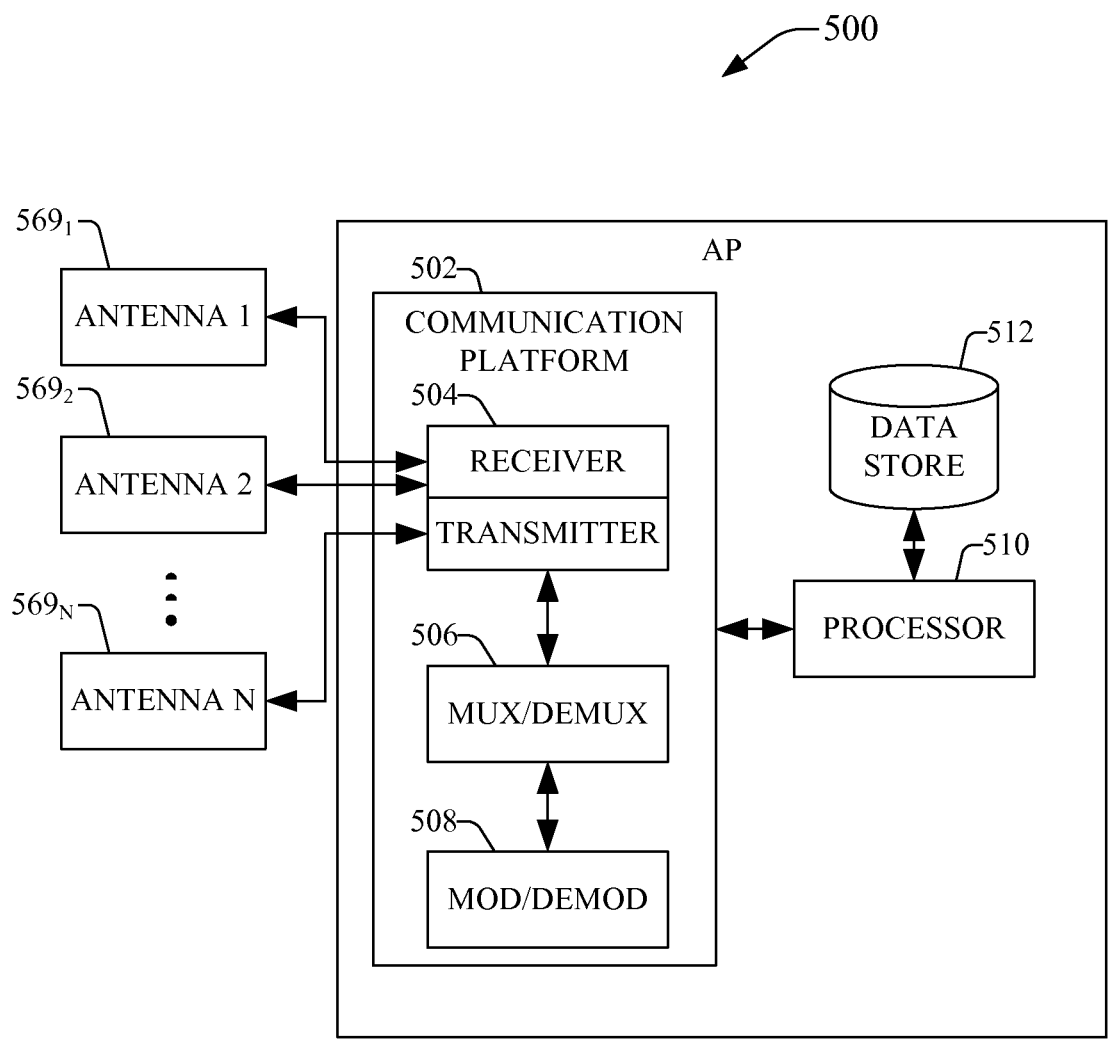
FIG. 5 illustrates a block diagram of an example access point (AP) in accordance with an aspect of the disclosed subject matter.

FIG. 5 illustrates a block diagram of an example AP 500 (e.g., base station) in accordance with an aspect of the disclosed subject matter. The AP 500 can receive and transmit signal(s) from and to wireless devices like access points (e.g., base stations, femto APs, pico APs), access terminals (e.g., UEs), wireless ports and routers, and the like, through a set of antennas $569_1$-$569_N$. In an aspect, the antennas $569_1$-$569_N$ are a part of a communication platform 502, which comprises electronic components and associated circuitry that can provide for processing and manipulation of received signal(s) and signal(s) to be transmitted. In an aspect, the communication platform 502 can include a receiver/transmitter 504 that can convert signal from analog to digital upon reception, and from digital to analog upon transmission. In addition, receiver/transmitter 504 can divide a single data stream into multiple, parallel data streams, or perform the reciprocal operation.

In an aspect, coupled to receiver/transmitter 504 can be a multiplexer/demultiplexer (mux/demux) 506 that can facilitate manipulation of signal in time and frequency space. The mux/demux 506 can multiplex information (e.g., data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 506 can scramble and spread information (e.g., codes) according to substantially any code known in the art, e.g., Hadamard-Walsh codes, Baker codes, Kasami codes, polyphase codes, and so on. A modulator/demodulator (mod/demod) 508 also can be part of the communication platform 502, and can modulate information according to multiple modulation techniques, such as frequency modulation, amplitude modulation (e.g., M-ary quadrature amplitude modulation (QAM), with M a positive integer), phase-shift keying (PSK), and the like.

The AP 500 also can comprise a processor(s) 510 that can be configured to confer and/or facilitate providing functionality, at least partially, to substantially any electronic component in or associated with the AP 500. For instance, the processor(s) 510 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, etc.

In another aspect, the AP 500 can include a data store 512 that can store data structures; code instructions; rate coding information associated with a served access terminal; system or device information like policies and specifications; code sequences for scrambling; spreading and pilot transmission; floor plan configuration; access point deployment and frequency plans; scheduling policies; and so on. The processor(s) 510 can be coupled to the data store 512 in order to store and retrieve information (e.g., information, such as algorithms, relating to multiplexing/demultiplexing or modulation/demodulation, etc.) desired to operate and/or confer functionality to the communication platform 502, and/or other operational components of AP 500.

In view of the example systems described herein, example methodologies that can be implemented in accordance with the disclosed subject matter can be better appreciated with reference to flowcharts in FIGS. 6-9. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a methodology disclosed herein could alternatively be represented as a series of interrelated states or events, such as in a state diagram. Moreover, interaction diagram(s) may represent methodologies in accordance with the disclosed subject matter when disparate entities enact disparate portions of the methodologies. Furthermore, not all illustrated acts may be required to implement a methodology in accordance with the subject specification. It should be further appreciated that the methodologies disclosed throughout the subject specification are capable of being stored on an article of manufacture to facilitate transporting and transferring such methodologies to computers for execution by a processor or for storage in a memory.

Figure 6:
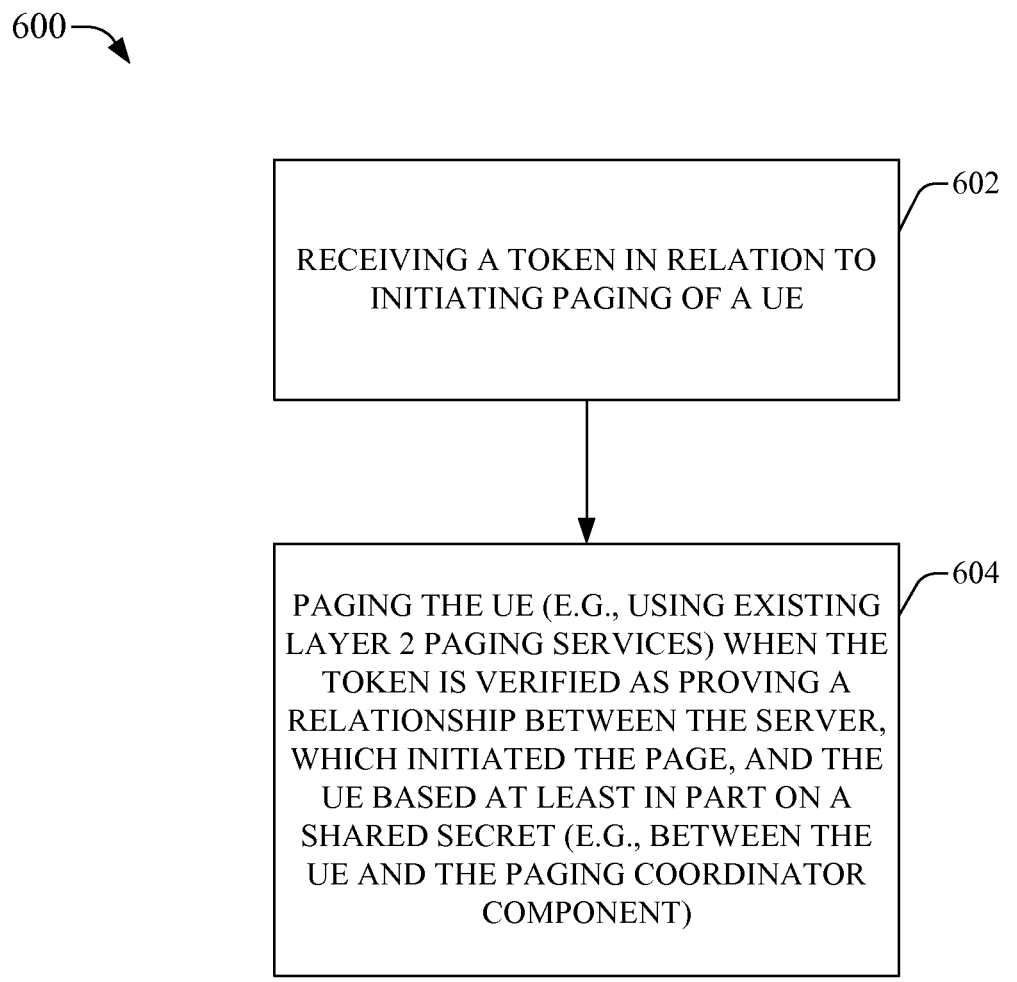
FIG. 6 illustrates a flowchart of an example methodology for paging a communication device in a communication network in accordance with various aspects of the disclosed subject matter.

FIG. 6 presents a flowchart of an example methodology 600 for paging a UE (e.g., 102) in a communication network in accordance with various aspects of the disclosed subject matter. At 602, a token can be received in relation to initiating paging of a UE. In an aspect, a paging coordinator component (e.g., 110) can receive the token and/or other information from a server 108 (e.g., paging initiator) initiating paging of the UE 102, where, for example, the server 108 can be associated with a third-party application or service (e.g., the server 108 can facilitate providing the third-party application or service) that does not have a prior or trusted relationship established with the network 106 and/or the paging coordinator component 110. The paging (e.g., notification, update, etc.) of the UE 102 can be in relation to a client application 114 on the UE 102 and applications, services or functions (e.g., email, messaging, news feed, etc.), that can be provided by the server 108 to the UE 102. In another aspect, information contained in the token can be hidden, for example, using a shared secret between the UE 102 and the paging coordinator component (e.g., using hash function or value) such that the paging coordinator component can discover such information using knowledge that the paging coordinator component has with regard to how the information was hidden (e.g., what hash function or value was employed by the UE 102 to hide the information) while other entities, such as the server 108, are not able to discover the hidden information.

At 604, the UE can be paged (e.g., using existing layer 2 paging services) when the token is verified as proving a relationship between the server, which initiated the page, and the UE based at least in part on a shared secret (e.g., between the UE and the paging coordinator component). In an aspect, the paging coordinator component can evaluate information contained in the token to determine whether the paging request from the server is legitimate or valid, or is instead malicious or otherwise improper. The information contained in the token can be obscured or hidden using a shared secret between the UE 102 and the paging coordinator component. For example, the UE 102 can employ a hash function or value to modify the information (e.g., identifier associated with the UE 102, identifier associated with the server 108, etc.) so that such information can be obscured or hidden from discovery by the server 108 and/or other entities. The paging coordinator component can be in a trusted relationship with the UE 102, so that the UE 102 and paging coordinator component each can know the shared secret or hash function or value. The paging coordinator component can utilize the shared secret to decipher or perform a hash check (when a hashing function is used) on the information contained in the token to discover the desired information (e.g., identifier associated with the UE 102, identifier associated with the server 108, etc.). The paging coordinator component can determine whether to issue the page to the UE 102 based at least in part on evaluation of the discovered information in the token. For instance, when the paging coordinator component determines that a relationship between the UE 102 and the server 108 is proved, the paging coordinator component can issue the page to the UE 102; or the paging coordinator component can determine that a page to the UE 102 is not to be issued when the paging coordinator component determines that a relationship between the UE 102 and the server 108 is not proved.

Figure 7:
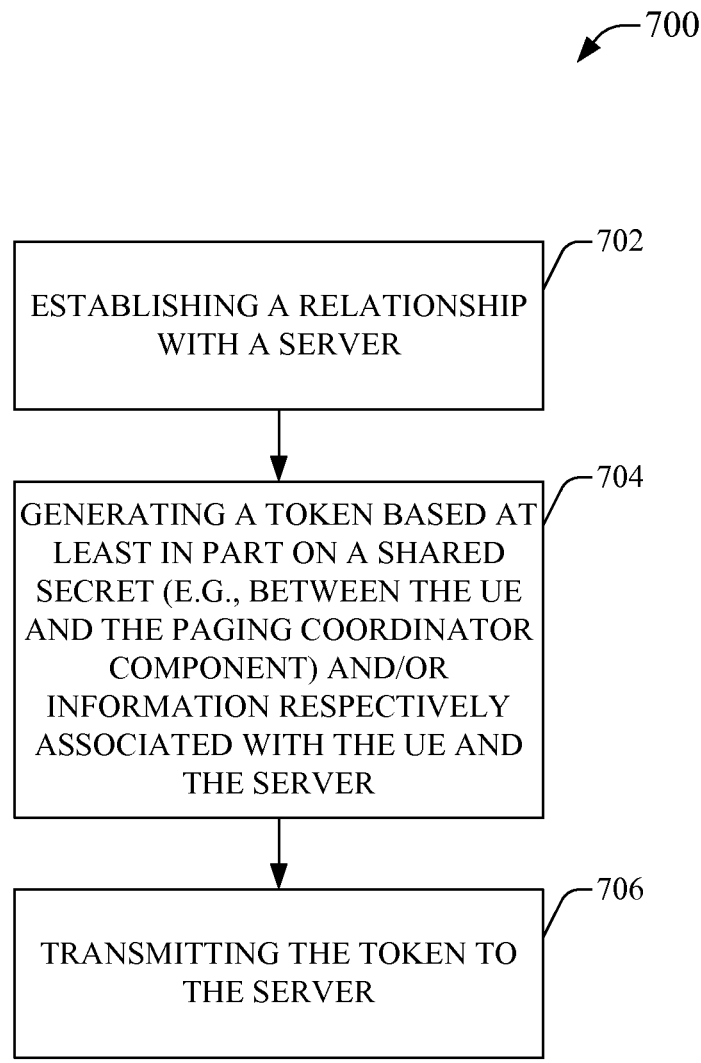
FIG. 7 depicts a flowchart of an example methodology that can generate a token to facilitate paging of a communication device in a communication network in accordance with an aspect of the disclosed subject matter.

FIG. 7 depicts a flowchart of an example methodology 700 that can generate a token to facilitate paging of a UE in a communication network in accordance with an aspect of the disclosed subject matter. At 702, a relationship can be established with a server (e.g., serving entity). For instance, the UE 102 can establish a relationship with (e.g., subscribe to) a server 108, where the server 108 can provide the UE 102 with desired applications, services, and/or functions (e.g., email service, news service, etc.). As desired, as part of establishing the relationship between the UE 102 and the server 108, a username and/or password can be employed, for example, where access to the server 108 is granted upon submission of the proper username and/or password to the server 108 by the UE 102. In an aspect, as desired, the desired applications, services, and/or functions associated with the server 108 can be third-party applications, services, and/or functions, where there is no prior or trusted relationship between the third-party applications, services, and/or functions (and associated server 108) and the network 106 (and associated paging coordinator component 110).

At 704, a token can be generated based at least in part on a shared secret (e.g., between the UE and the paging coordinator component) and/or information respectively associated with the UE and a server (e.g., serving entity). In an aspect, the UE 102 can generate a token that can include desired information, such as an identifier associated with the UE 102, an identifier associated with the server 108, or other information. The UE 102 can modify such information to hide the actual respective values of each piece of such information based at least in part on the shared secret in order to prevent certain entities, such as the server 108, from discovering the actual values of each piece of such information.

At 706, the token can be transmitted to the server (e.g., via the paging coordinator component). In an aspect, the UE 102 can transmit the token and/or shared secret to the paging coordinator component, and the token can be forwarded to the server 108. The server 108 can store the token for future use. For instance, when the server 108 desires to initiate paging of the UE 102 (e.g., to provide an update or a notification), the server 108 can retrieve the token from the data store and provide the token to the paging coordinator component In another aspect, the UE 102 can have a trust relationship with the paging coordinator component (e.g., via subscription to wireless communication services provided by a network operator associated with the paging coordinator component). Based at least in part on this trust relationship, the UE can share the secret with the paging coordinator component, where, upon receiving the token as part of a paging request initiated by the server 108, the paging coordinator component can utilize the shared secret to facilitate discovering the actual values of each piece of such information, evaluating the information, and verifying a received token to determine whether paging of the UE 102 by a particular server 108 is legitimate.

Figure 8:
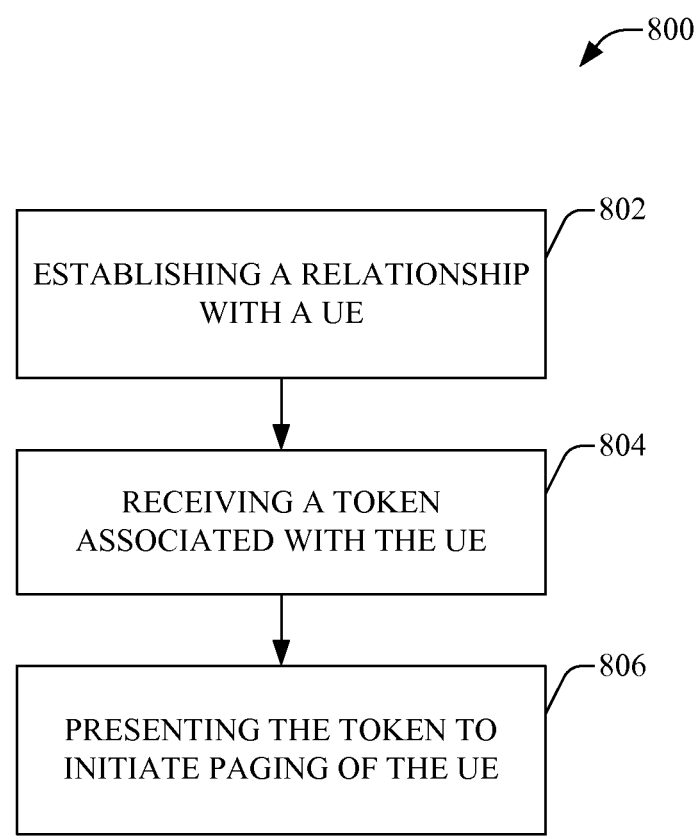
FIG. 8 illustrates a flowchart of an example methodology that can utilize a token to facilitate paging of a communication device in a communication network in accordance with an aspect of the disclosed subject matter.

FIG. 8 illustrates a flowchart of an example methodology 800 that can utilize a token to facilitate paging of a UE (e.g., 102) in a communication network in accordance with an aspect of the disclosed subject matter. At 802, a relationship can be established with a UE. In an aspect, the server 108 (e.g., which can be associated with a third-party application, service, and/or function that does not have a prior or trusted relationship with the network 106 and/or the paging coordinator component 110) can establish a relationship with the UE 102 (e.g., UE 102 can subscribe to the server 108), where the server 108 can provide the UE 102 with desired applications, services, and/or functions (e.g., email service, news service, etc.). As desired, as part of establishing the relationship between the UE 102 and the server 108, a username and/or password can be employed, for example, where access to the server 108 is granted upon submission of the proper username and/or password to the server 108 by the UE 102.

At 804, a token associated with the UE can be received. In an aspect, the paging initiator component 116 of a server 108 can receive a token from the UE 102, for example, via the paging coordinator component (e.g., 110), where the token can contain information that can facilitate proving to the paging coordinator component that a relationship exists between the server 108 and UE 102, for example, when the token is presented to the paging coordinator component as part of initiating paging the UE 102. The server 108 can store the token associated with the UE 102 for future use (e.g., paging of UE 102).

At 806, the token can be presented (e.g., transmitted) to initiate paging of the UE. In an aspect, the paging coordinator component 116 of the server 108 (e.g., paging initiator) can retrieve the token associated with the UE 102 from the data store associated with the server 108 to facilitate initiating paging of the UE 102. As desired, the paging coordinator component 116 also can present other information (e.g., message, such as a short message) with the token to the paging coordinator component to initiate paging of the UE 102. It is not necessary for the paging coordinator component to understand a message included with the token, and the message can be encrypted, if desired. The paging coordinator component can receive the token and/or other information and can verify or attempt to verify the token to determine whether paging of the UE 102 by the server 108 is legitimate and whether paging of the UE 102 is to occur.

Figure 9:
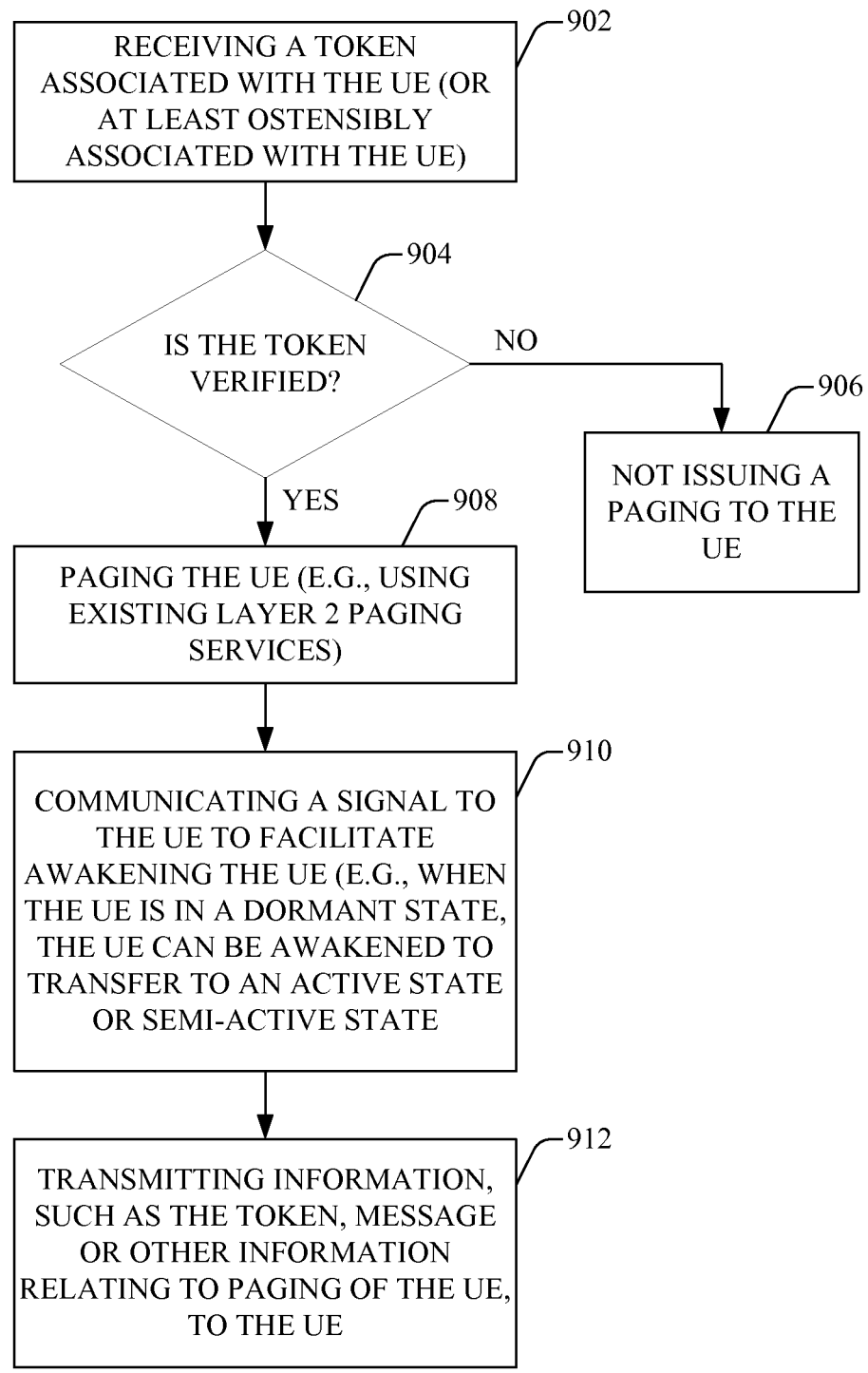
FIG. 9 illustrates a flowchart of an example methodology that can utilize a token to facilitate paging of a communication device in a communication network in accordance with another aspect of the disclosed subject matter.

FIG. 9 illustrates a flowchart of an example methodology 900 that can utilize a token to facilitate paging of a UE (e.g., 102) in a communication network in accordance with another aspect of the disclosed subject matter. At 902, a token associated with the UE (or at least ostensibly associated with the UE) can be received. In an aspect, the paging coordinator component (e.g., 110) can receive a token, and optionally a message, from a server 108 (e.g., paging initiator) to facilitate initiating paging of the UE 102, where the server 108 can be associated with, for example, a third-party application, service, and/or function that does not have a prior or trusted relationship with the network 106 and/or the paging coordinator component 110.

At 904, a determination can be made regarding whether the token is verified (e.g., verified as legitimate or valid). In an aspect, the paging coordinator component can evaluate information contained in the received token to verify or attempt to verify whether the received token is legitimate and thus whether the paging request from the server 108 is legitimate or valid, or is instead malicious or otherwise improper. In another aspect, the paging coordinator component can be in a trusted relationship with the UE 102, and they can share a secret, which can be utilized to facilitate securing information contained in the token so that the server 108 and/or other entities are not able to discover certain information (e.g., identifier of the UE 102) contained in the token. For example, the UE 102 can employ a hash function or value (e.g., based at least in part on the shared secret between the UE 102 and the paging coordinator component and/or shared secret (e.g., the password and/or username) between the UE 102 and the server 108) to modify the information (e.g., identifier associated with the UE 102, identifier associated with the server 108, etc.) so that such information can be obscured or hidden from discovery by the server 108 and/or other entities.

If it is determined that a relationship between the UE and the server is not proved, at 906, a paging is not issued to the UE. For example, if the paging coordinator component determines a relationship between the UE 102 and the server 108 is not proved, for example, due to determining that the discovered information (e.g., identifier associated with the UE 102) from the token does not match the UE 102 to which the page has been initiated, the paging coordinator component can determine that the UE 102 is not to be paged.

If, at 904, it is determined that a relationship between the UE and the server is proved, at 908, the UE can be paged (e.g., using existing layer 2 paging services). For instance, after evaluating the information discovered in the token based at least in part on the shared secret between the UE 102 and paging coordinator component, if the paging coordinator component determines that a relationship between the UE 102 and the server 108 is proved (e.g., identifier associated with the UE contained in the token matches the identifier associated with the UE to which the page is directed), the paging coordinator component can issue the page to the UE 102 (e.g., using existing layer 2 paging services).

At 910, a signal can be communicated to the UE to facilitate awakening the UE (e.g., when the UE is in a dormant state, the UE can be awakened to transfer to an active state or semi-active state). The paging coordinator component can transmit a signal to the UE 102 to facilitate notifying the UE 102 that it is being paged, so the UE 102 can switch from a dormant state (when the UE 102 is in the dormant state) to an active state or semi-active state in order to process the paging of the UE 102.

At 912, information, such as the token, message or other information, relating to paging of the UE can be transmitted to the UE. In an aspect, the paging coordinator component can transmit the desired information relating to paging of the UE 102 to the UE 102. When the UE 102 connects to the network 106, the token, the short message, and/or other information (e.g., the name of the paging initiator component 116) can be delivered to the client application 114 of the UE 102 via layer 2 paging messages, a hidden SMS, or via a retrieval server over IP connection, for example. The client application 114 can receive the token, the short message, and/or other information and can decide whether to initiate a connection to its corresponding server 108 that initiated the paging, and, as desired, can initiate the connection to that server 108, for example, by going through network entry process, obtain IP address, and opening a socket to facilitate communication between the UE 102 and the server 108.

It also is to be appreciated and understood that components (e.g., UE, base station, network, paging coordinator component, server paging initiator component, etc.), as described with regard to a particular system or methodology, can include the same or similar functionality as respective components (e.g., respectively named components) as described with regard to other systems or methodologies disclosed herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), phase change memory (PCM), flash memory, or nonvolatile RAM (e.g., ferroelectric RAM (FeRAM). Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD), Blu-ray disc (BD), . . . ), smart cards, and flash memory devices (e.g., card, stick, key drive . . . ).

What has been described above includes examples of systems and methods that provide advantages of the subject innovation. It is, of course, not possible to describe every conceivable combination of components or methodologies for purposes of describing the claimed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a memory to store instructions; and
a processor, coupled to the memory, that facilitates execution of the instructions to perform operations, comprising:
receiving a token from a server relating to initiation of a notification to a communication device by the server, wherein the token has originated from the communication device and comprises a first identifier associated with the communication device and a second identifier associated with the server, and wherein, based on a shared secret between the communication device and the system, the first identifier is modified to store a modified identifier value in the token to obscure the first identifier in the token from the server;
determining whether to transmit the notification to the communication device based on whether the token is verified; and
initiating transmission of the notification to the communication device, in response to a determination that the token is verified based on verification of the first identifier, wherein the first identifier is determined from the modified identifier value in the token using the shared secret.

2. The system of claim 1, wherein the server does not have a pre-existing trust relationship with the system that receives the token from the server.

3. The system of claim 1, wherein, the determination that the token is verified based on the verification of the first identifier comprises a determination that the token is verified based on the verification of the first identifier and a defined notification criterion, and wherein the operations further comprise:
in response to a determination that the token is verified based on the verification of the first identifier and the defined notification criterion, generating the notification.

4. The system of claim 1, wherein the second identifier associated with the server facilitates identification of the server by the system.

5. The system of claim 3, wherein the defined notification criterion provides that the token is verified in response to the first identifier contained in the token being determined to be a match with identification data, accessible to the system, to be associated with the communication device.

6. The system of claim 1, wherein the operations further comprise:
determining a location of the communication device in response to the token being determined to be verified; and
transmitting the notification to the communication device in response to the token being determined to be verified and in response to the location of the communication device being determined.

7. The system of claim 1, wherein the determining of the first identifier from the modified identifier value in the token using the shared secret comprises determining the first identifier in the token from the modified identifier value using the shared secret to de-obscure the first identifier in the token, wherein the obscuring of the first identifier in the token from the server facilitates preventing the server from determining the first identifier in the token.

8. The system of claim 1, wherein the operations further comprise denying transmission of the notification to the communication device in response to a determination that the token is not verified.

9. The system of claim 1, wherein the communication device is a wireless communication device.

10. A method, comprising:
receiving, by a system comprising a processor, a token that is used to initiate sending a notification message to a mobile communication device by a server, wherein the token comprises an identifier associated with the mobile communication device and a second identifier associated with the server, and the token is obtained by the server from the mobile communication device, and wherein, based on a shared secret between the mobile communication device and the system, the identifier in the token is modified to a modified identifier value to obscure the identifier in the token from the server;
determining, by the system, whether to send the notification message to the mobile communication device based on whether the token is verified; and
sending the notification message to the mobile communication device, in response to determining the token is verified based on verification of the identifier, wherein the identifier is determined from the modified identifier value in the token using the shared secret.

11. The method of claim 10, wherein the receiving the token further comprises receiving the token from the server that does not have a pre-existing trust relationship with the system.

12. The method of claim 10, further comprising:
receiving, by the system, first information that is the shared secret between the mobile communication device and the system;
determining, by the system, second information in the token using at least the shared secret comprising determining the identifier associated with the mobile communication device;
verifying, by the system, the token as valid in response to determining that the second information matches stored information associated with the mobile communication device, wherein the stored information is employed to facilitate proving that a relationship exists between the mobile communication device and the server initiating the sending of the notification message to the mobile communication device;
locating, by the system, the mobile communication device in response to the token being verified as valid; and
generating, by the system, the notification message to facilitate the sending of the notification message to the mobile communication device in response to the token being verified as valid and in response to the locating of the mobile communication device.

13. The method of claim 12, further comprising facilitating transferring, by the system, an operating state of the mobile communication device from a dormant state to one type of active state of a set of types of active states in response to the sending of the notification message to the mobile communication device to facilitate connecting the mobile communication device to the server, wherein the set of types of active states comprises an active state and a semi-active state.

14. A computer-readable storage device storing computer-executable instructions that, in response to execution, cause a system comprising a processor to perform operations, comprising:
modifying an identifier value of an identifier associated with a communication device, based on a shared secret between the communication device and a communication network device, to generate a modified identifier value that is included in a token to facilitate not revealing the identifier value of the identifier to a server that presents the token to the communication network device in connection with a sending of a message to the communication device by the communication network device, wherein the communication network device determines the identifier value in the token, based on the modified identifier value and the shared secret, to facilitate determining whether the token is verified, based on the identifier value, to facilitate determining whether to send the message to the communication device; and
generating the token comprising information relating to the modified identifier value associated with the identifier, a second identifier associated with the server, and the shared secret.

15. The computer-readable storage device of claim 14, wherein the modifying the identifier value of the identifier comprises modifying the identifier value of the identifier associated with the communication device using a hash function.

16. The computer-readable storage device of claim 14, wherein the operations further comprise:
transferring an operating state of the communication device from a dormant state to one type of active state of a set of types of active states in response to receiving the message from the communication network device, wherein the set of types of active states comprises an active state and a semi-active state; and
determining whether to initiate a connection with the server in response to the receiving of the message from the communication network device.

17. The computer-readable storage device of claim 14, wherein the operations further comprise randomly generating the modified identifier value that is included in the token.

18. The computer-readable storage device of claim 14, wherein the operations further comprise:
randomly generating a different modified identifier value associated with the identifier;
generating a different token comprising information relating to the different modified identifier value and the shared secret, wherein the different modified identifier value facilitates not revealing the identifier value of the identifier to a different server that presents the token to the communication network device in connection with the sending of the message to the communication device by the communication network device; and
transmitting the different token to the different server.

19. The system of claim 6, wherein the transmitting the notification to the communication device further comprises transmitting the notification to the communication device using a layer 2 identity associated with the communication device in accordance with a layer 2 protocol, wherein the notification is a layer 2 message, and wherein information relating to the first identifier is mapped to the layer 2 identity associated with the communication device.

20. The computer-readable storage device of claim 14, wherein the operations further comprise:

establishing a relationship between the communication device and the server;
generating the token based on the shared secret; and
transmitting the token to the server to enable the server to present the token to the communication network device to facilitate initiating the sending of the message to the communication device by the communication network device.

\* \* \* \* \*